Figure 1:
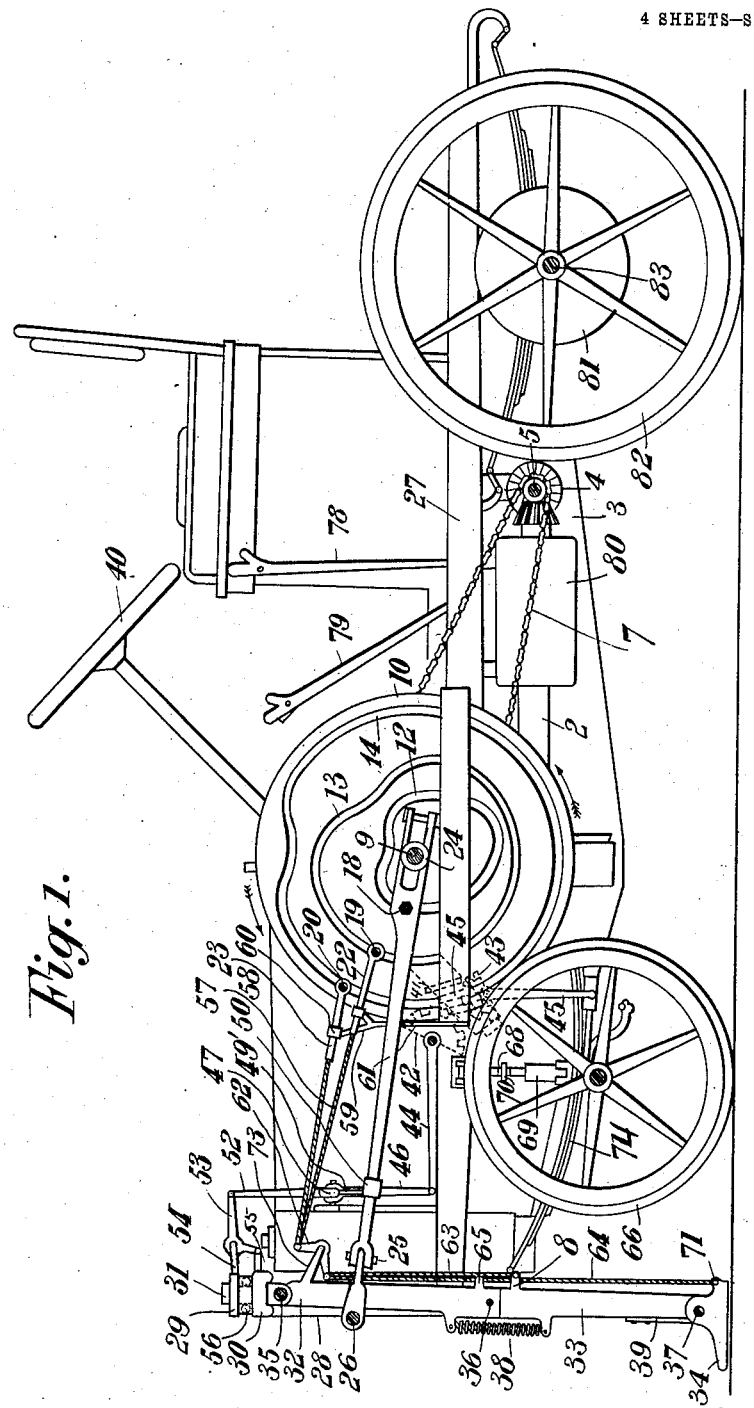

A. EHRLICH.
VEHICLE ADVANCING BY MEANS OF ARTIFICIAL LEGS.
APPLICATION FILED SEPT. 11, 1911.

1,079,695.

Patented Nov. 25, 1913.

4 SHEETS—SHEET 3.

Witnesses:

Inventor,
Adolf Ehrlich

Attorney

A. EHRLICH.
VEHICLE ADVANCING BY MEANS OF ARTIFICIAL LEGS.
APPLICATION FILED SEPT. 11, 1911.

1,079,695.

Patented Nov. 25, 1913.

4 SHEETS—SHEET 4.

Witnesses:

Inventor:
Adolf Ehrlich
Attorney.

UNITED STATES PATENT OFFICE.

ADOLF EHRLICH, OF BUDAPEST, AUSTRIA-HUNGARY.

VEHICLE ADVANCING BY MEANS OF ARTIFICIAL LEGS.

1,079,695. Specification of Letters Patent. Patented Nov. 25, 1913.

Application filed September 11, 1911. Serial No. 648,710.

*To all whom it may concern:*

Be it known that I, ADOLF EHRLICH, a subject of the Emperor of Austria-Hungary, and resident of Budapest, Austria-Hungary, have invented certain new and useful Improvements in Vehicles Advancing by Means of Artificial Legs, of which the following is a specification.

This invention relates to improvements in motor vehicles which are caused to advance by means of artificial legs.

The object of these improvements is to obtain a quiet, uniform motion of said vehicles, to allow the motion of them also on yielding and uneven surfaces or roads and to provide them with a steering mechanism corresponding to their construction and manner of working.

To this end the artificial legs made according to these improvements are composed of three parts the upper leg, the lower leg and the foot, connected together by means of three joints, the hip joint, the knee joint and the ankle joint and moved alternately by means of a cam disk provided with grooves and continuously rotating around a shaft the arrangement being such that the said legs move uniformly but nearly twice as rapidly forward as backward so that consequently the left leg, both legs, the right leg, then again both legs together are moved backward one after the other and thus cause the vehicle to move forward in the order explained. The vehicle is thus moved forward in an uninterrupted manner and the artificial legs are placed on the ground over which the vehicle travels, in a stretched position and without any shocks. The grooves provided on the rotating disks and which govern the said particular manner of movement of the legs and cause the connecting rods actuating the legs to move alternately forward and backward in a straight direction, are eccentrically arranged and have a symmetric heart shape composed of two unequal halves each of which forms an involute of a circle so as to obtain uniform working in the forward as well as in the backward direction, the smaller one of said halves moving the leg with nearly double the speed forward than the larger half leads it backward. On the outside of this groove the face of the cam wheel is provided with another groove which in a similar manner moves a shorter rod which by means of pieces of wire cable and bell crank levers inserted between them bends the lower leg at the knee joint backward with reference to the upper leg while the upper leg moves forward in the hip joint, so that the leg on yielding or uneven ground can move forward without hindrance and is again stretched by a coiled spring positioned in front of the knee joint, before it is again put on the ground. A third groove arranged on the same face of the wheel still farther on the outside bends the foot backward with reference to the lower leg during the time during which the upper leg covers the last part of its rearwardly directed motion, and thus lengthens the leg temporarily. The leg which then moves farther backward in spite of the fact that it forms a larger angle with the vertical line drawn through the hip joint, may exert at the same time a tractional effort on the vehicle owing to the extension cited above as the other leg, which a short space of time before had been put on the ground; besides it raises the front end of the vehicle which otherwise would be lowered.

The adjustment of the wheels which is usually employed in the usual motor vehicles is not sufficient for steering a vehicle which is moved forward by means of legs; besides the differential gear formed of gear wheels cannot be applied to the latter. The steering of the vehicle is governed according to the present invention by the fact that the pairs of legs together with their common bearings supporting the hip joints are brought into the desired direction; the action of the differential gear is replaced by the length of the step of the leg walking on the larger arc of the curve of the road being increased while the length of the step of the leg walking on the smaller arc is reduced. Both operations are carried out at the same time by means of a balance beam which is moved by a segment meshing with the worm of the steering mechanism while another segment moved by the same worm shifts in the usual manner the front wheels so that the vehicle can be steered also in cases when the legs are not in action during a downhill run, when stopping and so forth. The present improvements also provide means allowing of the distance between the vehicle frame and the steered front axle being adjusted according to the nature of the ground.

Figure 2:
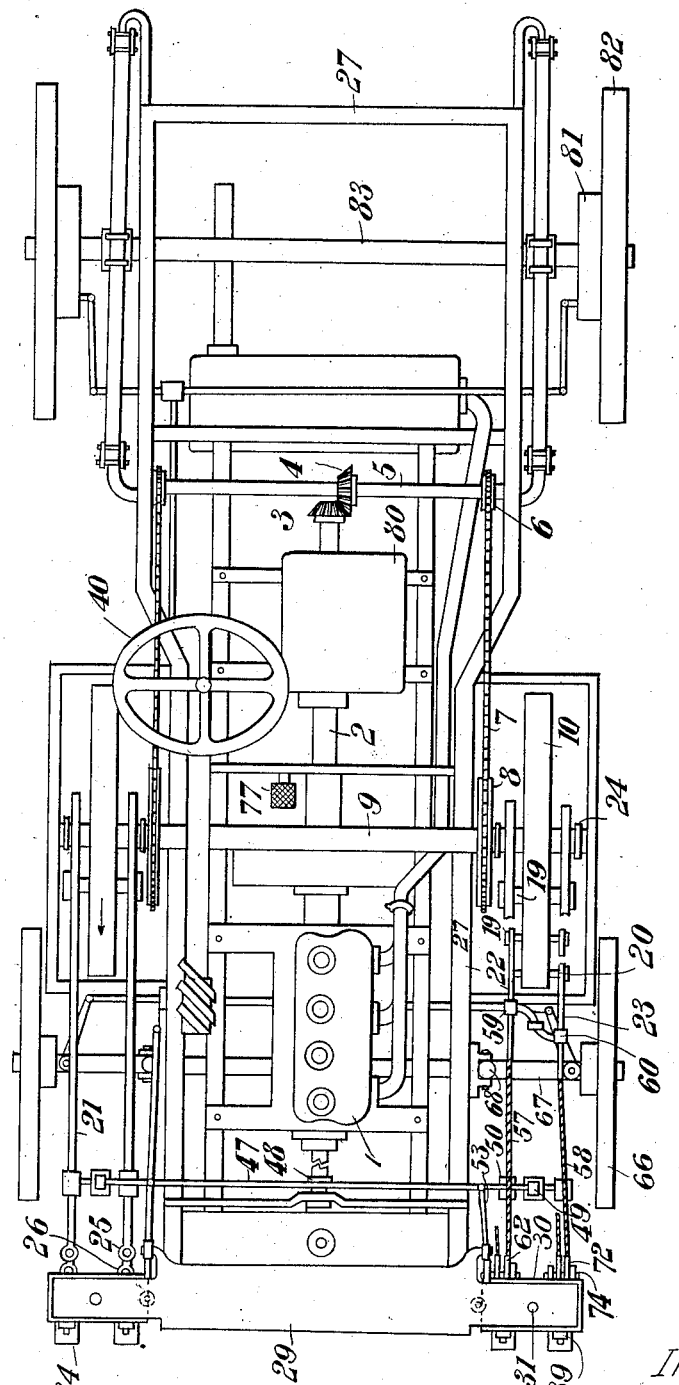
Figure 3:
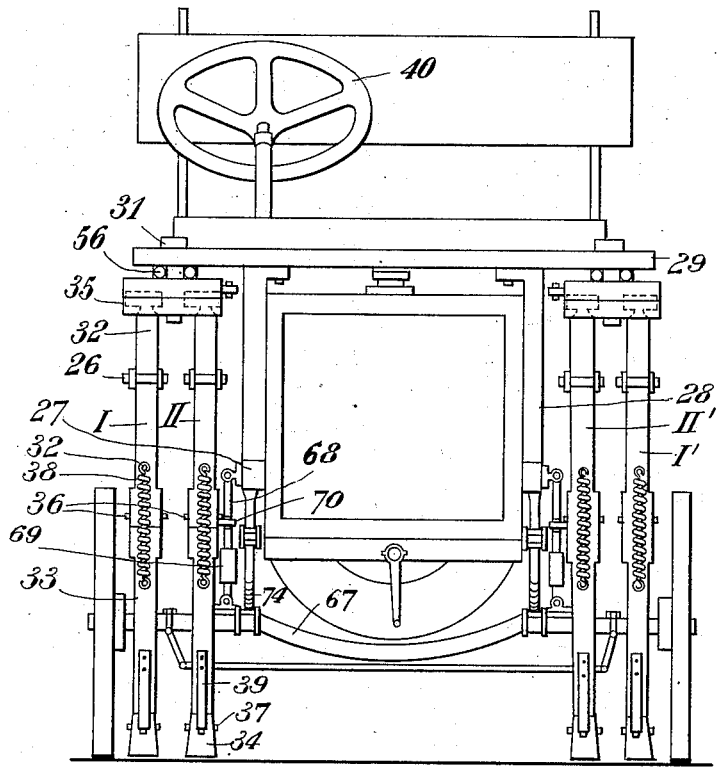
Figure 4:
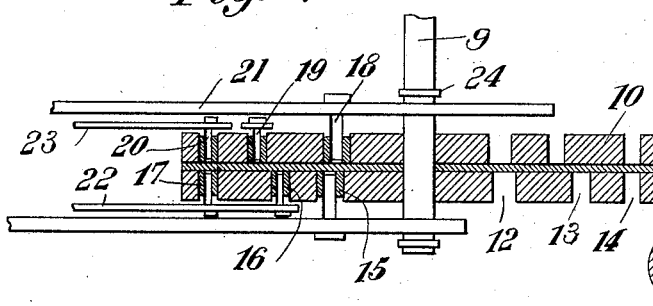
Figure 6:
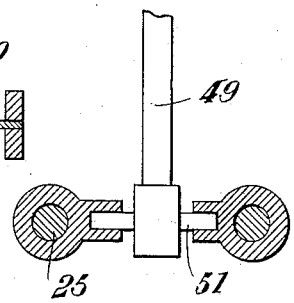
Figure 5:
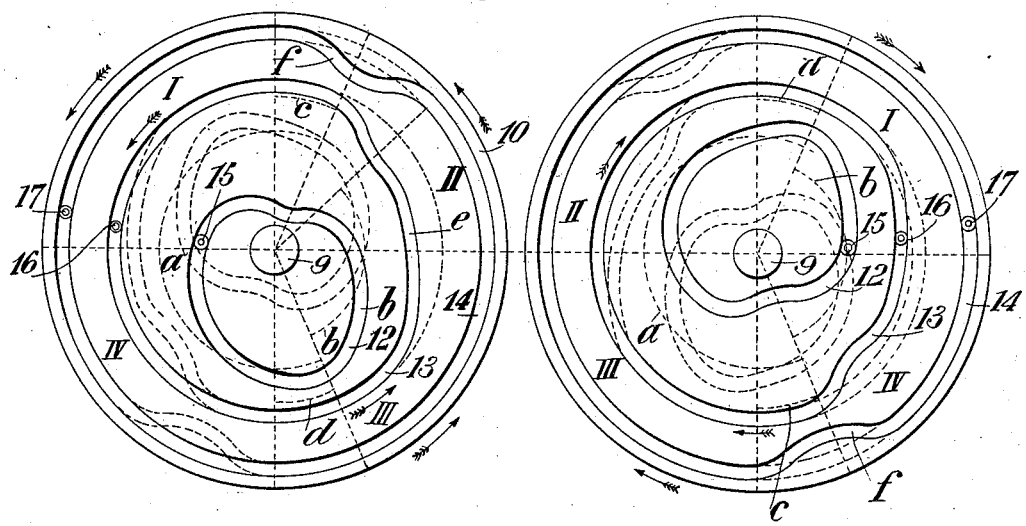

The accompanying drawings show one form of embodiment of the improved motor vehicle driven by a petrol motor, and in these drawings:

Figure 1 is a side elevation view of the vehicle; Fig. 2 shows the top plan view of same the bonnet being removed from the engine; Fig. 4 is a horizontal section of a fly wheel disk which shows the arrangement of the grooves the rollers contained in same, the pins engaging said rollers as well as the actuating rods and links moved by them. Fig. 5 shows both sides of a cam wheel, the relative position of the grooves of each side, the quadrants designated by the same Roman figures being opposite each other on both sides of the fly wheel disk. Fig. 6 is a detail view of the rod moved by the balance beam provided with rotary rings and serving to raise the rods actuating the legs.

The motor 1 drives by means of the driving shaft 2 and of the bevel gear wheels 3 and 4 the shaft 5 on which the small chain wheels 6 are keyed. The latter are connected by means of chains 7 with the sprockets 8 keyed on the shaft 9 whereby the rotation of the shaft 5 journaled on the framework 27 is transmitted to the shaft 9 journaled on frame 27.

Rigidly secured to the shaft 9 are two cam wheels 10 each side of which is provided with three cam grooves 12, 13 and 14 of which the innermost groove 12 is eccentrically arranged with reference to the shaft 9 and has the shape of a heart the unequal circle halves of which form involutes of circles.

Provided on the outside of the groove 12 is the larger, narrower groove 13. The groove 13 has an inwardly directed bend $e$ directed toward the groove 12 and corresponding to the smaller half $b$ of the latter. Still farther on the outside is the groove 14 which is provided with a bend $f$ directed inwardly opposite the part comprised between the circular half $a$ and the circular half $b$ of the groove 12 which part is positioned nearer to the shaft 9. The grooves arranged on the one side of the cam wheel 10 are displaced angularly 180° with reference to those on the opposite side.

The groove 12 during the rotation of the cam wheel 10 moves alternately by means of its smaller half $b$ the connecting rod 21 forward with a rapid and rectilinear motion and backward by means of the larger circular half $a$ with a slow and uniform motion. For this purpose the groove 12 is engaged by the roller 15 which in turn is engaged by the pin 18 which projects at right angles from the connecting rod 21. The rear end of the connecting rod 21 which projects beyond the pin 18 is forked and straddles the shaft 9, the latter having flanges 24 to prevent the connecting rod 21 from sliding sidewise. The front end of the connecting rod 21 passes through the ring 50 which is suspended from the laterally projected hinge 49, and is hingedly connected with the loop 26 as at 25. The loop 26 surrounds the upper leg 32 and is adapted to slide upward and downward on the latter.

During that part of the rotation which is governed by the arc parts $c$ and $d$ i. e. while the latter slide along the roller 16, the connecting rods 21 are pulled backward on both sides of the cam wheel 10; during the remainder of the time, the connecting rod is pulled backward on one side of the cam wheel while the connecting rod positioned on the opposite side is pushed forward.

The upper part 32 of the leg I is connected with the upper part of the neighboring leg II in the common journal 30 by means of a hinge 35 in such a manner that both can only oscillate in alternation forward and backward. The bearing 30 is arranged and adapted to rotate around the vertical pivot 31 under the cross beam 29 which is secured to the frame 27 by means of a beam 28. The lower end of the upper part 32 of the leg is connected with the lower part 33 by means of a knee joint 36 in such a manner that the lower part 33 can only recede backward with reference to the upper part 32 of the leg. The tension spring 38 positioned in front of the knee joint holds both parts in a stretched position.

The horizontally positioned foot 34 is connected with the lower end of the lower leg 33 by means of an ankle joint 37 so as to be able to move forward and backward with reference to the lower part of the leg. The rear end of the foot forms a heel 71 to which is attached the rope 64. The rope passes upward through the ring 65 on the upper part 32 of the leg. The rope is then secured to the lower arm of the bell crank lever 72 which is pivotally supported between extensions 73, on the upper part 32 of the leg. The leg is also provided with another bent lever 62 adapted to rotate about the transverse pivot 74. To this lever 62 is secured the rope 63. The rope 63 passes from the lever 62 to the portion 71 of the lower leg 33 and is secured thereto.

Positioned in the middle groove 13 of the cam wheel 10 is the roller 16 which is engaged by the pin 19 which projects at right angles from the rod 22. The latter passes through the ring 59 which is adapted to rotate around its shaft and is secured to the auxiliary frame 11 by means of beams 61 together with the remaining rings which on the same side of the vehicle serve for the same purpose. The front end of the rod 22 is connected with the rope 57 the front end of which is knotted to the upper arm of the bell crank lever 62. While the smaller half $b$ of the groove 12 causes the upper part 32 of the leg to move forward in the hip joint 35 the arc part *e* of the groove 13 pulls the rod 22 and with it the rope 57 backward whereby the bell crank lever 62 is caused to bend by means of the cable 63 the lower part 33 of the leg with reference to the upper part 32 so that the foot is raised from the ground. If during the further rotation of the disk 10 the traction of the rod 22 ceases, the knee spring 38 straightens the leg before the foot 34 is put on the ground.

The outermost groove 14 of the cam wheel 10 actuates the roller 17 which is engaged by the pin 20 which projects at right angles from the rod 23. The latter passes through the ring 60 which in turn is mounted on the beam 61 so as to be able to rotate around its horizontally positioned shaft. Connected with the front end of the rod 23 is the rope 58 the front end of which is knotted to the upper arm of this bell crank lever 72. While the arc part *f* of the groove 14 slides along the roller 17—during the same time in which the upper leg part 32 which is pulled backward by the rod 23 approaches its rear extreme position—the rod 23 pulls the heel 71 upward by means of the rope 58 the bell crank lever 72 and the rope 64, whereby the foot 34 is bent backward thus lengthening the leg momentarily. The spring 38 positioned in front of the joint 37 has a tendency to hold the foot 34 so that it is moderately bent backward.

The vehicle is steered by means of a hand wheel 40 through the medium of a worm 41 which meshes with two sectors 42 and 43.

The segment 42 which is positioned in front of the worm 41 shifts the pairs of legs together with their common hinge bearing 30 with reference to the cross beam 29 and also produces a greater length of step of the legs on the larger arc of the curve of the road, as well as a smaller length of steps on the smaller arc by means of a balance 47, while at the same time the lower segment 43 shifts the front wheels 66 in the usual manner by means of levers 45.

The segment 42 moves the horizontally arranged lever 44 the front end of which is hingedly connected with the rod 46 depending from the right arm of the balance 47. The central part of the balance beam oscillates around the pivot 48, from both ends of it rods 49' lead downward and rods 52 upward. Each of the upwardly leading rods 52 is movably connected with backwardly directed arm of a bell crank lever 53 the central part of which rotates around the free end of the extension 54 which projects rearwardly from the cross beam 29. The downwardly directed arm of the bell crank lever 53 is connected with the horizontal rod 55 the front end of which is pivotally connected with the inner edge of the rotary journal 30.

If by the rotation of the hand wheel 40 the free end of the lever 44 is raised on the right hand side by means of the segment 42, the rod 46 raises on this side the arm of the balance beam 47. The rod 52 rising from this arm raises the horizontal arm of the bell crank lever 53 the downwardly projecting arm of which pulls thereafter the rod 55 backward whereby the right hand bearing 30 together with the pair of legs depending from it rotates toward the left around the pivot 31. The left hand arm of the beam 47 lowers at the same time the rod 52; the latter pulls the horizontal branch of the bell crank lever 53 of this side downward; the downwardly directed arm of lever 53 forces the rod 55 forward which leads to the inner edge of the left hand bearing 30 whereafter the latter is also turned toward the left hand side. At the same time the balance beam 47 changes automatically also the length of the strides of the legs. The rod 49 which leads downward from the right hand arm of the balance beam raises by means of the rings 50 the front extreme parts of the actuating rods 21 of this side. The loops 26 consequently move upward on the upper parts 32 of the legs, whereby larger oscillations of the legs and thus larger strides of the latter are obtained. At the same time the left hand arm of the balance beam 47 lowers the actuating rods 21 of the left side by means of the rod 49 and the rings 50. With the said rods 21 the loops 26 of this side slide downward on the upper parts 32 of the legs whereby smaller strides of the legs are obtained on this side. Thus on the right side on the larger arc of the road curve larger strides are obtained while on the left hand side *i. e.* on the smaller arc of the road curve the smaller strides of the legs are obtained. At the same time, the worm 41 also moves the lower sector 43 which by means of levers 45 rotates in the usual manner the front wheels 66 in the direction which corresponds to the position of the legs.

The front axle 67 is suspended by means of a spring 74 while the vehicle is moving, under the frame 27 in such a manner that the front wheels 66 continuously roll on the ground, even when the vehicle is not charged and when the vehicle only rests on its legs. During a downhill run or when stopping the front axle takes the load from the legs the front part of the vehicle being more or less lowered and the distance between the frame and the front axle being changed. In order to allow of the said distance being adjusted according to the conditions of the ground, a suspension device has been provided between the frame 27 and the front axle 67, this suspension device comprising the pivot 68 provided with screw threads and movably connected with the frame 27, a ring 70 adapted to be adjusted on said pivot and a tube 69 connected in a movable manner with the front axle and adapted to receive the pivot 68. As to the remaining parts the construction of the vehicle corresponds to that of usual motor cars driven by petrol engines. The pedal lever 77 serves to disengage the driving shaft 2 from the motor 1. The hand lever 78 actuates the gear box 80, the hand lever 79 actuating the inner brake 81 acting on the rear wheel 82 which freely runs on the rear axle 83.

Having now fully described my said invention, what I claim and desire to secure by Letters Patent, is:—

1. In a vehicle of the kind described the combination with the framework of carrying and steering wheels, legs composed each of an upper leg part, a lower leg part and a foot, hinges connecting the said leg parts together and with the said framework, a driving shaft transversely journaled on said framework, means for rotating the said shaft, cam wheel keyed on said shaft, three cam grooves corresponding to said leg parts and provided in said cam wheel and connecting rods positively connecting the said grooves with the said leg parts so that the said grooves directly reciprocate said rods.

2. In a vehicle of the kind described the combination with the framework of carrying and steering wheels, a plurality of legs composed each of an upper leg part, a lower leg part, and a foot part, hinges connecting the said parts with each other and with the said framework, a transverse driving shaft, means for rotating said driving shaft, cam wheels keyed on said shaft, an inner cam groove provided in each face of each cam wheel and having an asymmetrical heart shape the unequal halves arc involutes of circles, a connecting rod connecting each of said grooves positively with each of said upper leg parts, the arrangement being such that the smaller half of said cam groove moves the said upper leg part forward with a relatively great speed, and the larger half of said cam groove moves the same part backward with a slower and uniform motion, substantially as and for the purpose set forth.

3. In a vehicle of the kind described the combination with the framework of carrying and steering wheels, a plurality of legs composed each of an upper leg part, a lower leg part and a foot part, means for hingedly connecting said leg parts with each other and with the said framework, a transverse driving shaft, means for rotating said shaft, a plurality of cam wheels keyed on said shaft, an inner cam groove in each side of each of said wheels, this groove being composed of unequal halves, means for operatively connecting said inner cam groove with said upper leg part, a second cam groove provided in each side of each of said cam wheels around the said inner cam groove and concentrically to the said driving shaft, an inwardly directed bend in the said second cam groove opposite the smaller half of said inner cam groove, means comprising a rod for operatively connecting the said second cam groove with the said lower leg part the arrangement being such that the rod bends the lower leg part backward with reference to the upper leg part while the said inner cam groove moves the said upper leg part rapidly forward so that the foot part is raised from the ground during the forward motion of the leg, substantially as and for the purpose set forth.

4. In a vehicle of the kind described the combination with the framework of carrying and steering wheels, a plurality of legs composed of an upper leg part, a lower leg part and a foot part, means for hingedly connecting said leg parts with each other and with the said framework, a transverse driving shaft, means for rotating said shaft, a plurality of cam wheels keyed on said shaft, an inner cam groove in each side of each of said cam wheels, means for operatively connecting said inner cam groove with the upper part of each leg, a second cam groove provided in each side of each of said cam wheels and surrounding the said inner cam groove, means for operatively connecting the said second cam groove with said lower leg part, a third cam groove provided in each side of each of said cam wheels and surrounding the said second cam groove, a radially inwardly directed depression provided in said third cam groove opposite that arc part of the said inner cam groove which causes the said upper leg part to perform the last part of its rearwardly directed way, means comprising a rod and adapted to positively connect said outer cam groove with the foot part of the leg so that the latter is bent backward with reference to the lower part of the leg during that space of time during which the upper leg part covers the last part of its rearwardly directed way, substantially as and for the purpose set forth.

5. In a vehicle of the kind described the combination with the framework of carrying and steering wheels, a plurality of artificial propelling legs arranged by pairs, a common bearing for each pair of legs, a vertical pivot connecting said common bearing with said framework, means for rotating in curves said pairs of legs around said vertical pivot with reference to the said framework, said means comprising a balance beam, a pivot provided in the middle of said balance beam, rods rising from said balance beam and adapted to cause the said pairs of legs to rotate around their vertical pivot, and rods descending from said balance beam and means for changing the amplitude of the strides of the legs and adapted to be actuated by said rods, substantially as and for the purpose set forth.

6. In a vehicle of the kind described the combination with the framework of the vehicle of carrying and steering wheels, a plurality of artificial propelling legs arranged by pairs, means for actuating said legs so as to propel the vehicle, a balance beam, means connecting said balance beam with said pairs of legs, a steering device comprising a worm, two toothed segments meshing with said worm and adapted to be actuated at the same time by it, a lever operatively connecting the upper one of said segments with the said balance, and a lever operatively connecting the lower one of said segments with the steering front wheels, substantially as and for the purpose set forth.

In testimony whereof I have hereunto set my hand in presence of two witnesses.

ADOLF EHRLICH.

Witnesses:
C. van Velsen,
Emil Von Wanreele.

Copies of this patent may be obtained for five cents each, by addressing the "Commissioner of Patents, Washington, D. C."